(12) United States Patent
Rodriguez-Val et al.

(10) Patent No.: US 7,051,116 B1
(45) Date of Patent: May 23, 2006

(54) CLIENT DEVICE IDENTIFICATION WHEN COMMUNICATING THROUGH A NETWORK ADDRESS TRANSLATOR DEVICE

(75) Inventors: Richard Rodriguez-Val, Fairfax, VA (US); Richard A. Watson, Jr., Austin, TX (US)

(73) Assignee: America Online, Inc., Dulles, VA (US)

( * ) Notice: Subject to any disclaimer, the term of this patent is extended or adjusted under 35 U.S.C. 154(b) by 753 days.

(21) Appl. No.: 09/983,042

(22) Filed: Oct. 22, 2001

Related U.S. Application Data

(60) Provisional application No. 60/299,454, filed on Jun. 21, 2001.

(51) Int. Cl.
*G06F 15/16* (2006.01)
*H04L 12/56* (2006.01)

(52) U.S. Cl. ..................... 709/245; 370/401
(58) Field of Classification Search ............... 709/245; 370/401
See application file for complete search history.

(56) References Cited

U.S. PATENT DOCUMENTS

| 5,577,197 | A | 11/1996 | Beck |
| 5,606,668 | A | 2/1997 | Shwed |
| 5,793,763 | A | 8/1998 | Mayes et al. |
| 5,877,724 | A | 3/1999 | Davis |
| 5,918,019 | A | 6/1999 | Valencia |
| 6,006,272 | A | 12/1999 | Aravamudan et al. |
| 6,055,236 | A | 4/2000 | Nessett et al. |
| 6,167,120 | A | 12/2000 | Kikinis |
| 6,219,706 | B1 | 4/2001 | Fan et al. |
| 6,381,222 | B1 | 4/2002 | Kikinis |
| 6,421,325 | B1 | 7/2002 | Kikinis |
| 6,487,605 | B1 | 11/2002 | Leung |
| 6,535,517 | B1 | 3/2003 | Arkko et al. |
| 6,603,762 | B1 | 8/2003 | Kikinis |
| 6,654,373 | B1 | 11/2003 | Maher, III et al. |
| 6,671,739 | B1 | 12/2003 | Reed |
| 6,738,814 | B1 | 5/2004 | Cox et al. |
| 6,757,836 | B1 | 6/2004 | Kumar et al. |
| 2001/0000707 | A1 | 5/2001 | Kikinis |

FOREIGN PATENT DOCUMENTS

EP 0889668 A2 1/1999

(Continued)

OTHER PUBLICATIONS

Evans, Shara: "Tunnelling through the web" Standards Watch, 'Online'; Mar. 1999; http://www.telsyte.com.au/standardswatch/tunnels.htm, pp. 1-6.

(Continued)

*Primary Examiner*—Larry D. Donaghue
(74) *Attorney, Agent, or Firm*—Fish & Richardson P.C.

(57) ABSTRACT

Enabling a host system to communicate with and to identify at least one client device that communicates with the host system through a network address translator device includes enabling communications from a first client device through the network address translator device. A data packet is received that includes a payload portion and an attribute portion, where the attribute portion includes a destination address that indicates a destination for the data packet and a nearest source address. A portion of the received data packet other than the nearest source address is examined for a host-assigned identifier that identifies a client device that communicated the received data packet. The received data packet typically is processed in accordance with predetermined host system controls accessible to the host system for the first client device identified, such as host-enabled parental controls.

44 Claims, 7 Drawing Sheets

FOREIGN PATENT DOCUMENTS

| | | |
|---|---|---|
| JP | 11-275083 | 10/1999 |
| JP | 2001-237898 | 8/2001 |
| WO | WO 99-19988 A | 4/1999 |
| WO | WO 99/52244 | 10/1999 |
| WO | WO 00/72532 | 11/2000 |
| WO | WO 01/61897 | 8/2001 |

OTHER PUBLICATIONS

W. Townsley et al.: "Layer 2 Tunneling Protocol L2TP" IETF, 'Online '; http://www.ietf.org/rfc/rfc2661.txt; Aug. 1999, pp. 1-80.

Redback Networks: "PPP over Ethernet" 'Online'; Mar. 1999; http://www.redback.com/en-US/whitepp/pdf/wp_pppoe_comparison.pdf, pp. 1-8.

M. Borella et al., "Realm Specific IP: Framework," pp. 1-30 (Jul. 2000), available at ftp://ftp.isi.edu/internet-drafts/draft-ietf-nat-rsip-framework-05.txt.

G. Montenegro et al., "RSIP Support for End-to-end IPsec," pp. 1-18 (Jul. 2000), available at http://www.ietf.org/internet-drafts/draft-ietf-nat-rsip-ipsec-04.txt.

L. Mamakos et al., "A Method for Transmitting PPP Over Ethernet (PPPoE)," pp. 1-15 (Feb. 1999), available at ftp://ftp.isi.edu/in-notes/rfc2516.txt.

P. Srisuresh et al., "Traditional IP Network Address Translator (Traditional NAT)," http://www.ietf.org/rfc/rfc3022.txt?number=3022, Jan. 2001, pp. 1-16.

M. Holdrege et al., "Protocol Complications with the IP Network Address Translator," http://www.ietf.org/rfc/rfc3027.txt?number=3027, Jan. 2001, pp. 1-20.

G. Tsirtsis et al., "Network Address Translation—Protocol Translation (NAT-PT)," http://www.ietf.org/rfc/rfc2766.txt?number=2766, Feb. 2000, pp. 1-21.

P. Srisuresh et al., "IP Network Address Translator (NAT) Terminology and Considerations," http://www.ietf.org/rfc/rfc2663.txt?number=2663, Aug. 1999, pp. 1-30.

K. Egevang et al., "The IP Network Address Translator (NAT)," http://www.cis.ohio-state.edu/cgi-bin/rfc/rfc1631.html, May 1994, pp. 1-10.

"Network Address Translation Technical Discussion," http://safety.net/nattech.html, Apr. 18, 1996, pp. 1-4.

Eric A. Hall, "Hide & Seek with Gateways & Translators," http://www.ehsco.com/reading/19970215ncw1.html, Feb. 15, 1997, pp. 1-5.

| Client Device # | NAT Device Assigned Identifier | Host Assigned Identifier |
|---|---|---|
| 420a | 192.168.16.12 | 10.728.13.1 |
| 420b | 192.168.16.14 | 12.640.17.3 |
| . . . | . . . | . . . |
| 420n | nnn.nnn.nn.nn | nn.nnn.nn.n |

Fig. 4B

CLIENT DEVICE IDENTIFICATION WHEN COMMUNICATING THROUGH A NETWORK ADDRESS TRANSLATOR DEVICE

CROSS REFERENCE TO RELATED APPLICATIONS

This application claims priority from U.S. Provisional Application No. 60/299,454, filed Jun. 21, 2001, and titled "Client Device Identification When Communicating Through A Network Address Translator Device," which is incorporated by reference.

TECHNICAL FIELD

This invention relates to identifying client devices that communicate with a host system through a network address translator device.

BACKGROUND

An increasing number of client devices are arranged in a network (e.g., a local area network (LAN)) in businesses and in the home. These networked client devices may be configured to communicate with devices external to the network through a network address translator (NAT) device. The NAT device enables communication with and among internal client devices within the LAN by associating a set of internal addresses with those internal devices such that communications between the internal client devices and one or more external devices and/or systems (e.g., a host system or the Internet) are established based on a translation between the set of internal addresses and a set of external addresses perceived by the external devices or systems as being associated with the internal client devices. The NAT device performs the address translation necessary for communication between one or more of the client devices and a device or system external to the LAN.

Typically, the set of internal addresses and the client devices themselves are masked and hidden to devices external to the LAN by the NAT device. For example, a host system may recognize the LAN as a single device rather than recognizing the individual client devices or users of the individual client devices within the LAN, or the host system may not be able to distinguish a particular client device or user of the particular device within the LAN.

SUMMARY

In one general aspect, enabling a host system to communicate with and to identify at least one client device that communicates with the host system through a network address translator device includes enabling communications from a first client device through the network address translator device. A data packet is received that includes a payload portion and an attribute portion, where the attribute portion includes a destination address that indicates a destination for the data packet and a nearest source address. A portion of the received data packet other than the nearest source address is examined for a host-assigned identifier that identifies a client device that communicated the received data packet. The received data packet typically is processed in accordance with predetermined host system controls accessible to the host system for the first client device if the host-assigned identifier identifies the first client device.

Implementations may include one or more of the following features. For example, enabling communications may include enabling communications from the first client device operating in a home network through the network address translator device.

The payload portion of the received data packet may be examined for the host-assigned identifier. The host-assigned identifier may differ from the nearest source address.

Communications may be enabled from the first client device using a tunneling protocol and/or using Layer Two Tunneling Protocol (L2TP). Communications may be enabled from the first client device without using cookies. The first client device may be assigned a first identifier to be included in payload portions of data packets that are communicated between the first client device and the host system, where the host-assigned identifier may include the first identifier. The host system may uniquely identify the first client device through use of the first identifier.

Communications may be enabled from a second client device that communicates through the network address translator device. The received data packet may be processed in accordance with predetermined host system controls accessible to the host system for the second client device if the host-assigned identifier identifies the second client device. The second client device may be assigned a second identifier to be included in payload portions of data packets that are communicated between the second client device and the host system, where the host-assigned identifier includes the second identifier. The host system may uniquely identify the second client device through use of the second identifier.

The first identifier may include a first routable IP address and the second identifier may include a second routable IP address. The predetermined host system controls may include parental controls, controls over personal identification information communicated to a third party, and/or controls over a personalized web page. The predetermined host system controls may be maintained by the host system.

The attribute portion of the received data packet also may include a source address that identifies the network address translator device such that the attribute portion of the received data packet may be examined for the source address and the source address may be used to determine whether the received data packet is a first data packet received from the network address translator device. The payload portion of the received data packet may be examined for the host-assigned identifier that identifies the client device that communicated the received data packet only when the received data packet is determined to be the first data packet received from the network address translator device.

A user of the first client device may be identified based on the examined host-assigned identifier and a user identifier, and the received data packet may be processed based on the examined host-assigned identifier and the user identifier. The user identifier may include a user name, and also may include a password. The received data packet may be processed based on the examined host-assigned identifier, the user name, and/or the password.

The client device may be identified from among several client devices based on the examined host-assigned identifier, where the received data packet may be processed in accordance with the predetermined host system controls accessible to the host system for the identified client device.

In another general aspect, enabling at least one client device to be identified by and communicate with a host system through a network address translator device includes communicating with the host system using a first client device that communicates through the network address translator device having a nearest source address. A first identifier that differs from the nearest source address and identifies the first client device may be embedded in a portion of a data packet other than the nearest source address communicated between the first client device and the host system. The data packet may be sent to the host system, and the host system may examine and process the data packet in accordance with predetermined host system controls accessible to the host system for the first client device when the portion of the data packet includes the first identifier.

Implementations may include one or more of the following features. For example, the first identifier may be embedded in a payload portion of the data packet. The data packet may be sent to the host system, and the host system may examine the payload portion and process the data packet in accordance with predetermined host system controls accessible to the host system for the first client device when the payload portion includes the first identifier.

The first client device may operate in a home network that communicates through the network address translator device. The first client device may communicate with the host system using a tunneling protocol and/or using L2TP. The first client device may communicate with the host system without using cookies. The first identifier may be received from the host system to identify the first client device. The first identifier may be used to uniquely identify the first client device.

A second client device that communicates through the network address translator device may communicate with the host system. A second identifier to identify the second client device may be embedded in a portion of a data packet other than the nearest source address communicated between the second client device and the host system. The data packet may be sent to the host system, which may examine the portion of the data packet and process the data packet in accordance with predetermined host-accessible system controls for the second client device when the portion of the data packet includes the second identifier. The second identifier may be embedded in a payload portion of the data packet. The data packet may be sent to the host system, and the host system may examine the payload portion and process the data packet in accordance with predetermined host system controls accessible to the host system for the client device when the payload portion includes the second identifier. The second identifier may be received from the host system to identify the second client device. The second identifier may be used to uniquely identify the second client device.

The first identifier may include a first routable IP address and the second identifier may include a second routable IP address.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

FIG. 4B is an exemplary table illustrating one or more identifiers that may be assigned to client devices.

Like reference symbols in the various drawings may indicate like elements.

DETAILED DESCRIPTION

Figure 1:
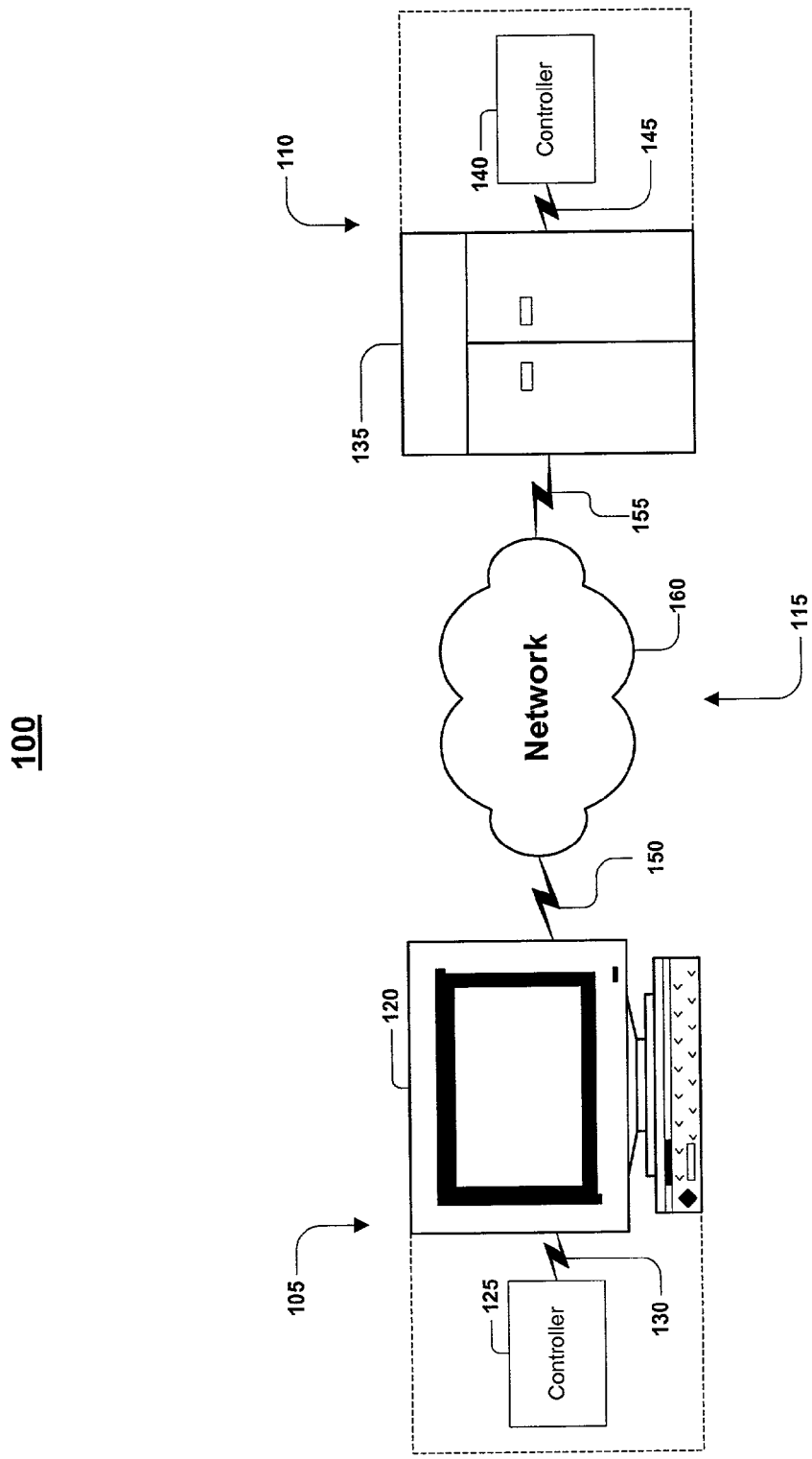
FIG. 1 is a block diagram of a communications system.
Figure 2:
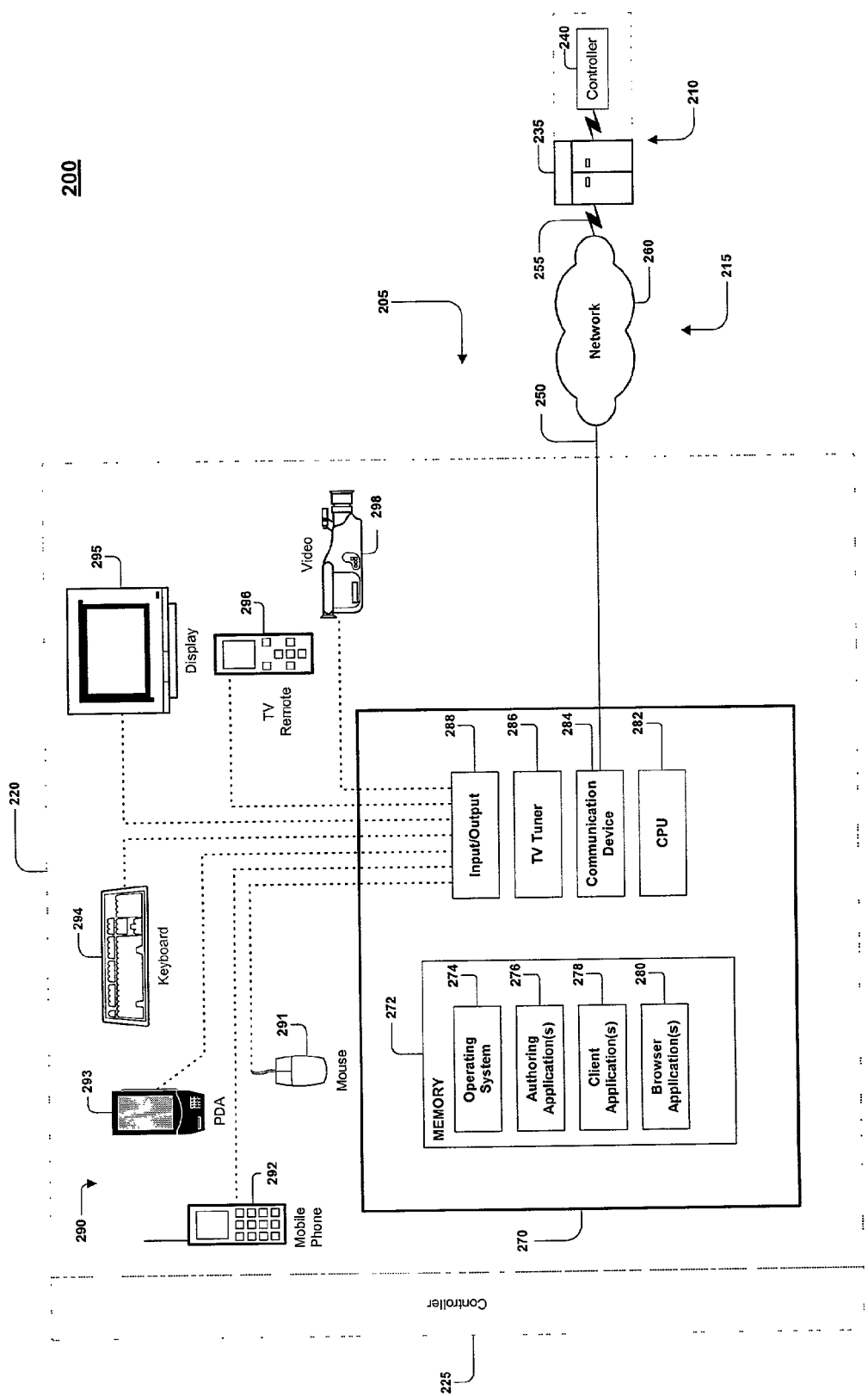
FIGS. 2 and 3 are expansions of the block diagram of FIG. 1.
Figure 3:
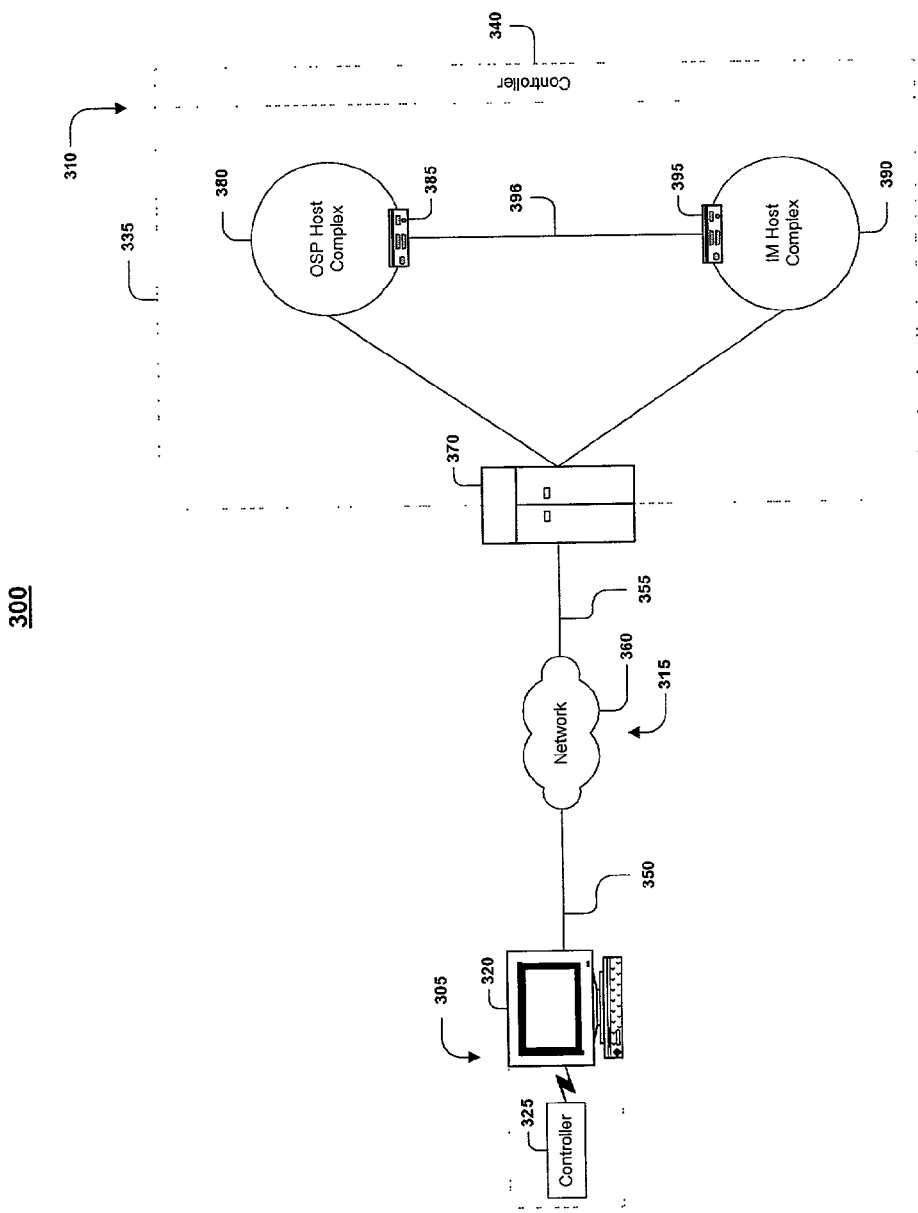

For illustrative purposes, FIGS. 1–3 describe a communications system for implementing techniques for transferring electronic data. For brevity, several elements in the figures described below are represented as monolithic entities. However, as would be understood by one skilled in the art, one or more of these elements may include numerous interconnected computers and components designed to perform a set of specified operations and/or dedicated to a particular geographical region.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host controller 135) is generally capable of executing instructions under the command of a client controller 125 (or a host controller 140). The client device 120 (or the host device 135) is connected to the client controller 125 (or the host controller 140) by a wired or wireless data pathway 130 (or pathway 145) capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 capable of enabling direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery or tunneling mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system 200 of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to and may illustrate one possible implementation of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, Windows ME™, Windows XP™, OS/2, Mac OS X, Unix, and Linux) and one or more application programs. Examples of application programs include authoring applications 276 (e.g., word processing, database programs, spreadsheet programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering content such as standard Internet content and email content. Other examples of application programs may include, for example, a PPP client, an UDP client, a PPPoE client, and an L2TP client, which may be included as a client application 278 or may be a separate application program used to support other application programs, such as the client applications 278 and the browser applications 280.

The general-purpose computer 270 also includes a central processing unit 282 (CPU) for executing instructions in response to commands from the client controller 225. In one implementation, the CPU 282 executes instructions included in one or more of the application programs installed on the internal or external storage 272 of the general-purpose computer 270. In another implementation, the CPU 282 executes instructions included in application programs externally stored in and executed by one or more device(s) external to the general-purpose computer 270.

The general-purpose computer 270 typically will include a communication device 284 for sending and receiving data. One example of the communication device 284 is a modem, such as a DSL modem, a cable modem, or a satellite modem. Other examples include, a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving TV programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and/or an audiovisual input device 298. Other examples may include voice recognition and synthesis devices (not shown).

Although FIG. 2 illustrates devices, such as a mobile telephone 292, a PDA 293, and a TV remote control 296, as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some or all of the components and devices described above.

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and may illustrate one possible implementation of the host systems 110 and 210 shown in FIGS. 1 and 2.

The host system 310 includes a host device 335 and a host controller 340. The host controller 340 generally is capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

In the implementation shown by FIG. 3, the host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 may include communication software, such as, for example, an OSP client application and an IM client application. The OSP and IM client applications are designed to facilitate the subscriber's interactions with the respective services and, in particular, may provide access to the services available within the respective host complexes. For example, in an Instant Messaging application, a subscriber may use the IM client application to determine whether particular subscribers ("buddies") are online, to exchange instant messages with particular subscribers, to participate in group chat rooms, to send and receive files such as pictures, invitations or documents, to find other subscribers with similar interests, to receive or perceive customized news and stock quotes, and to search the Web.

Typically, the OSP host complex 380 supports services such as email, discussion groups, chat, news services, and Internet access. The OSP host complex 380 is generally designed with an architecture that enables the machines within the OSP host complex 380 to communicate with each other, where certain protocols (i.e., standards, formats, conventions, rules, and structures) are employed to enable the transfer of data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 generally is independent of the OSP host complex 380, and supports IM services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the IM services. The IM host complex 390 has an architecture that enables the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway 396. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4A:
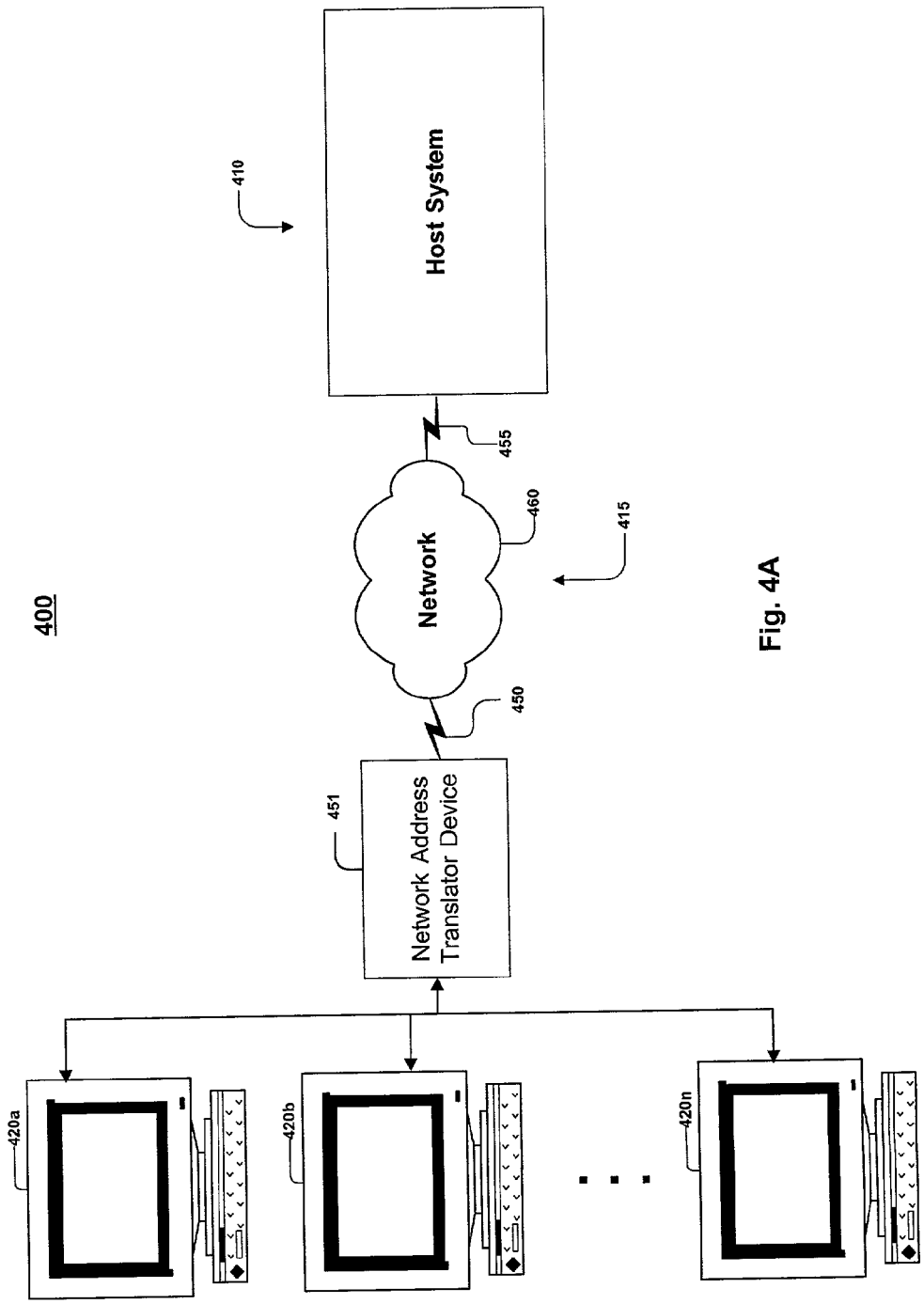
FIG. 4A is an expansion of the block diagram of FIG. 1 including a network address translator device.

FIG. 4A shows an implementation of a communications system 400 that includes a host system 410, a communications link 415, one or more client devices 420, and a network address translator (NAT) device 451. The communications link 415 may include communication pathways 450, 455 enabling communications through one or more delivery networks 460.

Examples of several elements within the communications system 400 of FIG. 4A are broadly described above with respect to FIGS. 1–3. In particular, the host system 410 and the communications link 415 typically have attributes comparable to those described with respect to host systems 110, 210, and 310 and communications links 115, 215, and 315 shown in FIGS. 1–3. Likewise, the client devices 420 of FIG. 4A may have attributes comparable to and may illustrate one possible implementation of the client devices 120, 220, and 320 shown in FIGS. 1–3, and the communication pathways 450, 455 and delivery networks 460 typically have attributes comparable to and may describe one possible implementation of the communication pathways 150, 155, 250, 255, 350, and 355, and the delivery networks 160, 260, and 360, shown in FIGS. 1–3.

Communications system 400 may include multiple client devices 420a–420n arranged in a network configuration, for example, a LAN or a WAN. More specifically, the client devices 420a–420n may be arranged in a home network configuration. Client devices 420a–420n may communicate with host system 410 through the NAT device 451. NAT device 451 includes one or more devices capable of performing network address translation to enable multiple client devices 420a–420n to communicate with the host system 410 and other external devices or systems by translating between a set of addresses assigned to the client devices 420a–420n by the host system 410 and a set of addresses used by the NAT device 451 to identify and distinguish the client devices 420a–420n internally.

FIG. 4B is an exemplary table that illustrates the association between identifiers assigned by NAT device 451 and host-assigned identifiers, which are discussed below in more detail with respect to FIG. 5. For instance, NAT device 451 may assign client device 420a an identifier (e.g., an address, a port, or a combination of address and port), in this instance 192.168.16.12, while host system 410 assigns client device 420a a different identifier (e.g., a routable IP address, a token, a combination of alphanumeric characters, or any combination of these types of identifiers), in this instance 10.728.13.1. Similarly, NAT device 451 may assign client device 420b an identifier (e.g., 192.168.16.14), while the host system 410 assigns a different identifier (e.g., 12.640.17.3). Thus, as illustrated by the table, each client device 420a–420n may be assigned multiple identifiers and a relationship between the identifiers may be stored.

Failing to recognize and thus distinguish the individual client devices or individual users of the individual client devices may prevent external systems from enforcing or enabling features that are based on distinctions among individual client devices or users, such as parental access controls. Similarly, without recognition of or distinction among client devices and their users, it may not be possible for an external device (e.g., an Internet Service Provider (ISP) host device) to make host-maintained preferences specific to particular client devices and their users (e.g., personal identification settings, personal web pages, account information, wallet information, and financial information) accessible to those devices or users.

Figure 5:
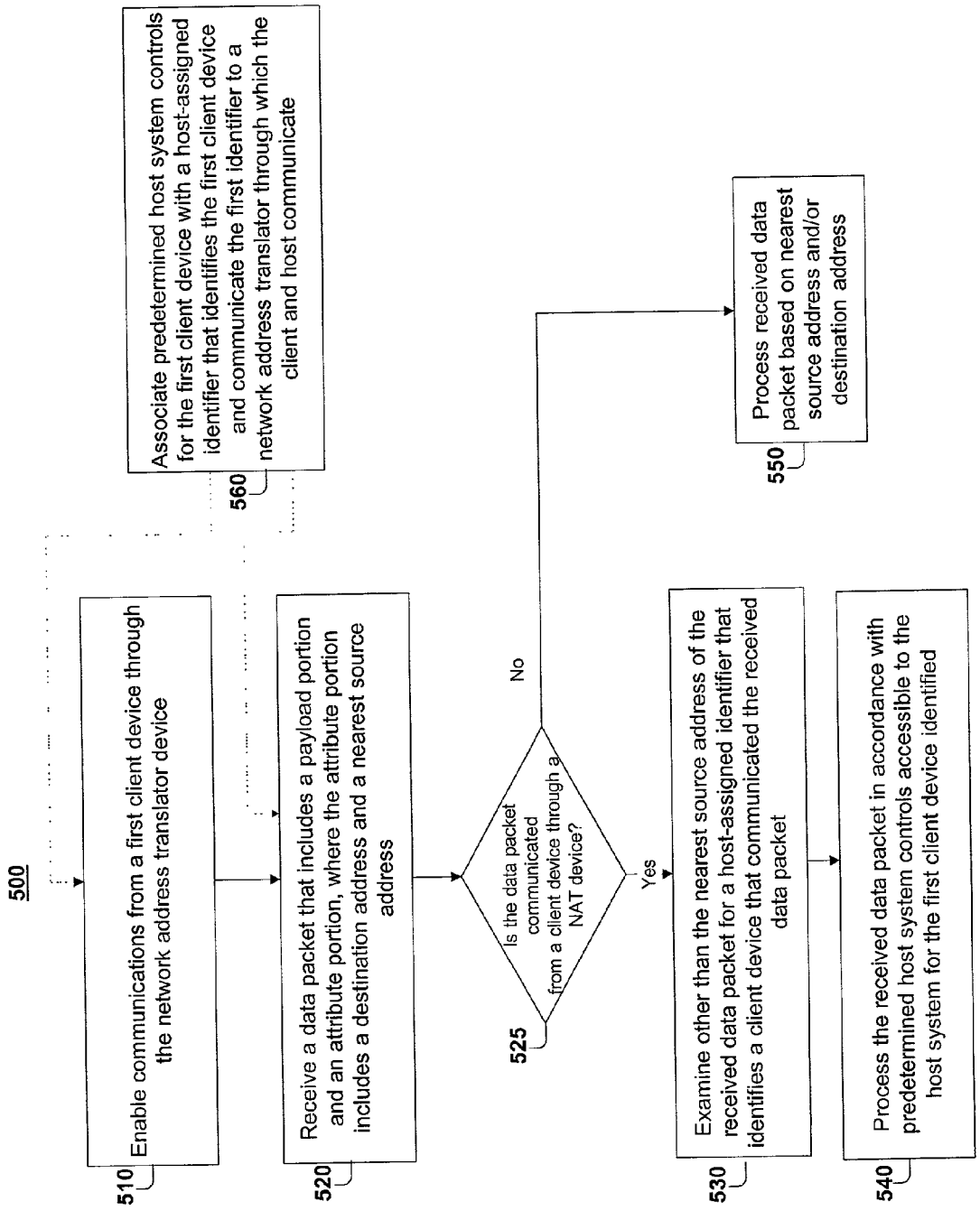
FIG. 5 is a flow chart of an exemplary process used by a host system to assign an identifier to at least one client device with which it communicates through a network address translator device and to communicate with that client device.

FIG. 5 illustrates an exemplary process 500 used by a host system to assign an identifier to at least one client device with which it communicates through a NAT device and to communicate with that client device. Process 500 may be performed by the systems and/or components described above with respect to FIGS. 1–4A. In general, process 500 includes enabling communications from a first client device (step 510). Next, a data packet is received (step 520). The data packet includes a payload portion and an attribute portion, with the attribute portion including one or more addresses, such as a destination address and a nearest source address.

After receiving a data packet, the host system determines whether the received data packet was communicated by the first client device through a NAT device (step 525). If the received data packet was communicated by the first client device through a NAT device, then the host system examines a portion of the received data packet other than the nearest source address in an attempt to identify a host-assigned identifier of the client device that communicated the received data packet (step 530). After the data packet is examined by the host system (step 530), the received data packet is processed in accordance with predetermined host system controls accessible to the host system for the first client device identified (step 540).

If the host system determines that the received data packet was not communicated by the first client device through a NAT device (step 525), then the received data packet is processed otherwise (step 550). For example, the data packet may be processed based on the nearest source address and/or the destination address.

Predetermined host system controls for the first client device may be associated with a host-assigned identifier (e.g., a first identifier) that identifies the first client device and that is communicated to a NAT device through which the client device and the host system communicate (step 560). This association may be made prior to enabling communications from the first client device (step 510) or prior to receiving a data packet (step 520). Associating predetermined host system controls for the first client device with a host-assigned identifier (step 560) typically may be performed by the host system 410 of FIG. 4A. The host-assigned identifier may include, for example, a routable IP address, a token, a combination of alphanumeric characters, or any combination of these types of identifiers. Once predetermined host system controls are associated with a host-assigned identifier (step 560), the host-assigned identifier may be communicated through a NAT device to a client device to be included in payload portions of data packets that are communicated between the client device and the host system through the NAT device. The host-assigned identifier generally is used to uniquely identify the client device to which it is assigned. In one implementation, the identifier may be assigned by a tunneling mechanism component of the host system.

Process 500 may be repeated and may be performed with respect to one or more client devices. Thus, the host system may communicate with and identify one or more client devices that communicate with the host system through a NAT device.

Enabling communications from the first client device (step 510) may include enabling communications from the first client device (e.g., using a protocol and/or a tunneling protocol mechanism). In one implementation, for example, a tunneling mechanism may be included as part of the host system 410 of FIG. 4A. The tunneling mechanism may enable communications using different protocols that support the tunneling mechanism, such as, for example, L2TP, PPP, PPPoE, UDP, TCP, token-based tunneling protocols, and combinations of these protocols. In one implementation, enabling communications from the first client device (step 510) may include enabling communications from the first client device without using cookies.

A received data packet (step 520) may include a payload portion and an attribute portion. The attribute portion of a data packet may include a source address, a destination address, a source port, and/or a destination port. The source address in the attribute portion may include a nearest source address, which may be the source address of the NAT device. Prior to communicating a data packet from a client device to the host system, the NAT device may replace the source address of the client device in the attribute portion with the source address of the NAT device. The NAT device may perform this address translation for one or more client devices that communicate to external systems through the NAT device. The payload portion of the data packet typically includes the data message that is communicated between a client device and a host system.

In one implementation, when communications between the client devices and the host system use L2TP, the nearest source address may include an L2TP call number or a combination of the L2TP call number and an IP address.

After receiving the data packet (step 520), the host system may determine whether or not the data packet was communicated from a client device through a NAT device (step 525). Additionally or alternatively, the host system may treat all received data packets as if they were communicated from a client device through a NAT device. The host system may determine that the data packet was communicated through a NAT device in a variety of ways. For example, the host system may use a look-up table that includes the NAT device's routable IP address. The NAT device may use a flag or indicator to indicate to the host system that the data packet is from a NAT device. Also, the host system may recognize that the data packet is from a NAT device because the data packet is sent to a designated port at the host system. Other methods of recognizing that the packet is from a NAT device also are possible. In one implementation, the host system may examine the payload portion of the first data packet received from the client device to determine if the data packet is from a NAT device.

If the host system determines that the received data packet was not communicated through a NAT device (step 525), the host system may process the data packet in accordance with predetermined host system controls for the nearest source address or controls that are otherwise assigned (step 550), perhaps without having to examine the received data packet for a host-assigned identifier (step 530). By contrast, if the received data packet was communicated through a NAT device (step 525), then the host system may examine portions other than the nearest source address of the received data packet for a host-assigned identifier that can be used to identify the client device that communicated the data packet (step 530).

In one implementation, examining portions other than the nearest source address (step 530) includes examining the payload portion of the received data packet for the host-assigned identifier. Examining the payload portion of the received data packet may include scanning the payload portion for the host-assigned identifier. Examining portions other than the nearest source address (step 530) also may include examining the attribute and/or payload portion of the received data packet for a host-assigned identifier that differs from the nearest source address and that identifies the client device that communicated the received data packet.

Once the host system examines portions other than the nearest source address of the received data packet (step 530), the host system processes the received data packet in accordance with predetermined host system controls accessible to the host system (step 540). For example, if the host-assigned identifier identifies a first client device, then the host system processes the data packet in accordance with predetermined host system controls accessible to the host system for the first client device (step 540).

The predetermined host system controls may include, for example, parental controls and/or controls over personal financial information, a personalized web page, personal identification information communicated to a third party, and/or wallet information. In addition to being accessible by the host system or as an alternative thereto, the predetermined host system controls may be maintained by the host system.

Processing the received data packet (step 540) may include communicating the data packet to a device within the host system. Additionally or alternatively, processing the received data packet (step 540) may include communicating the data packet to a system or a device external to the host system.

When examining the received data packet (step 530) does not reveal a host-assigned identifier (not shown), then the host system may process the received data packet (step 540) by discarding the data packet. Additionally or alternatively, in this instance, the host system may process the received data packet (step 540) by communicating the data packet to a device within the host system or to a device external to the host system that may be designed to handle unrecognized data packets, or by applying default controls to the data packet.

Process 500 may further include identifying a user of a client device based on a user identifier (step 530), alone or in combination with the examined host-assigned identifier. For example, the user identifier may include a user name (e.g., a name or a screen name) and/or a password. Thus, the host system may process received data packets (step 540) in accordance with predetermined host controls that are maintained based on the examined host-assigned identifier and/or the user identifier. For instance, the host system may enforce parental controls for a particular user based on either one or a combination of the host-assigned identifier and the user identifier.

Process 500 may further include identifying the client device from among several client devices based on the examined host-assigned identifier (step 530). In this instance, the received data packet may be processed (step 540) in accordance with the predetermined host system controls accessible to the host system for the identified client device.

In one implementation, the data packet is identified as being communicated from a NAT device (step 525) by examining the attribute portion of the received data portion for the source address, where the source address identifies the NAT device. After examining the attribute portion, the source address may be used to determine whether the received data packet is a first data packet received from the NAT device. The host system only examines the payload portion of the data packet for the host-assigned identifier when the received data packet is determined to be a first data packet received from the NAT device.

In one implementation, received data packets (step 520) may be examined for a host-assigned identifier that identifies the client device that communicated the received data packet (step 530) whether or not the data packet has been identified as being communicated from a NAT device (step 525). In this instance, the received data packet may be processed (step 540) in accordance with the predetermined host system controls accessible to the host system for the identified client device.

Figure 6:
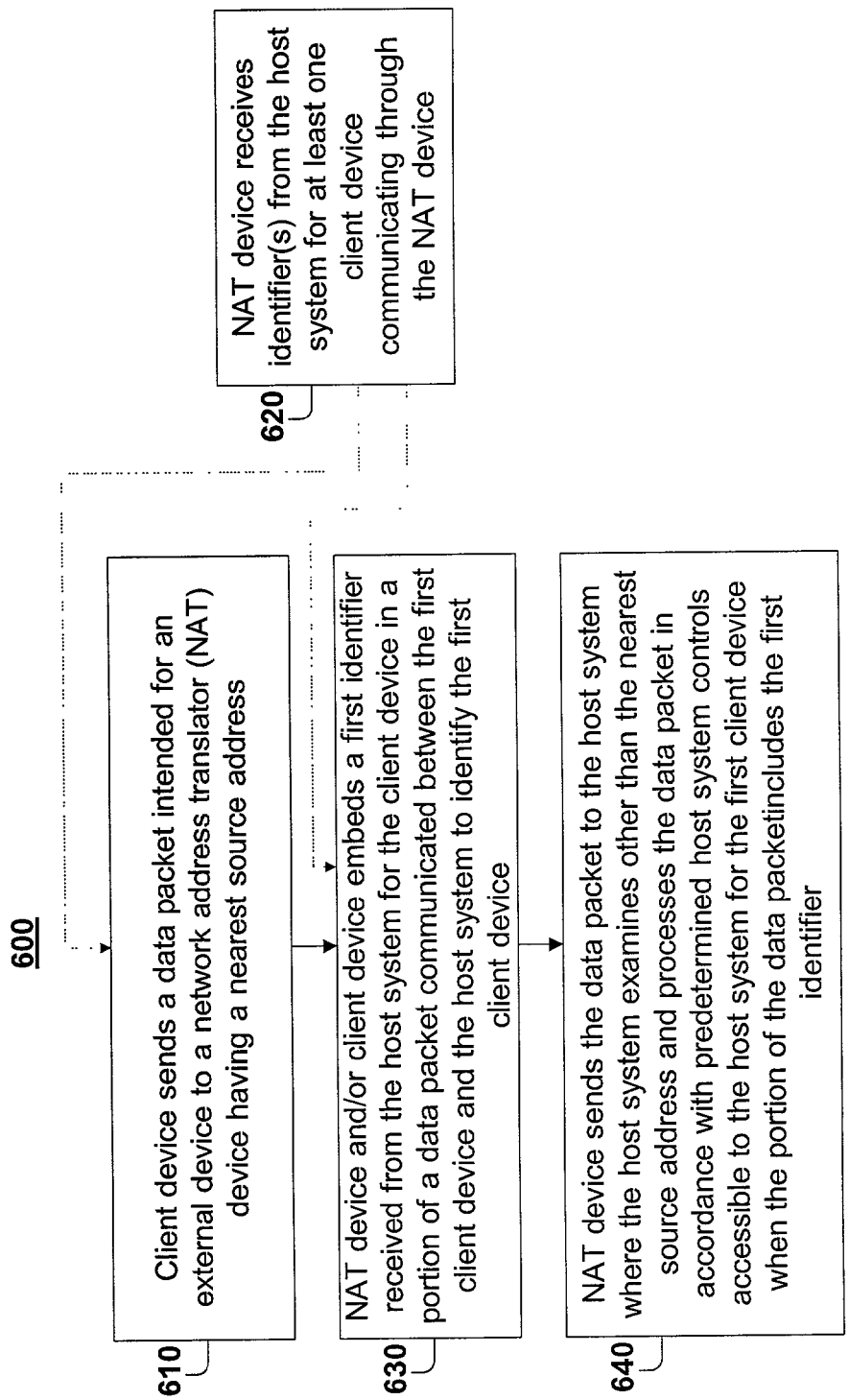
FIG. 6 is a flow chart of an exemplary process used by at least one client device to receive a host-assigned identifier and to communicate with a host system through a network address translator device.

FIG. 6 illustrates an exemplary process 600 for at least one client device to be identified by and to communicate with a host system through a NAT device. Process 600 may be performed by the systems and/or components described above with respect to FIGS. 1–4A. Initially, a client device sends a data packet intended for an external device to a NAT device (step 610). Prior or subsequent to the client device sending the data packet, the NAT device receives an identifier from the host system for each client device communicating through the NAT device (step 620). The identifier received from the host system is embedded (e.g., by the NAT device or the client device) in a portion of the data packet communicated between the client device and the host system to identify the client device (step 630). The data packet with the embedded identifier then is sent to the host system, where the host system examines the data packet for a source identifier other than the nearest source address corresponding to the NAT device. The host system then processes the data packet in accordance with predetermined host system controls accessible to the host system for a client device identified (step 640).

More specifically, for example, communicating with the host system (step 610) may include communicating from a client device with the host system using a tunneling mechanism or otherwise, as described above with respect to FIG. 5. Process 600 may be repeated and may be performed with respect to one or more client devices. Thus, one or more client devices may communicate through a NAT device with the host system and each client device may be identified by the host system. This enables the host system to enforce predetermined host controls that are particular to each client device communicating through a NAT device and that are accessible to the host system, such as, parental and other controls as described above with respect to FIG. 5.

Receiving the identifier (step 620) may include receiving the identifier from the host system for use to uniquely identify the particular client device associated with the source NAT device. Multiple client devices communicating through the same NAT device may each receive a different identifier from the host system for use in uniquely identifying each particular client device. In one implementation, the identifier is received from a tunneling mechanism that is associated with or included as a part of the host system.

The identifier may be embedded in the data packet (step 630) to allow the host system to identify the particular client device that communicated the data packet by examining the data packet for the identifier. The identifier may be embedded into the payload portion of the data packet or otherwise.

Sending the data packet to the host system (step 640) may include sending the data packet to the host system and having the host system examine an appropriate portion or all of the data packet and process the data packet in accordance with predetermined host system controls accessible to the host system for the client device when the data packet is found to include the identifier. Sending the data packet to the host system (step 640) also may include sending the data packet to the host system and having the host system examine the data packet for a host-assigned identifier that is different from the nearest source address. The host system then may process the data packet in accordance with the predetermined host system controls accessible to the host system for the client device that sent the data packet.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for a host system to communicate with and to identify at least one client device that communicates with the host system through a network address translator device, the method comprising:
  enabling communications from a first client device through the network address translator device;
  receiving a data packet that includes a payload portion and an attribute portion, wherein the attribute portion includes a destination address that indicates a destination for the data packet and a nearest source address;
  examining a portion of the received data packet other than the nearest source address for a host-assigned identifier that identifies a client device that communicated the received data packet;
  processing the received data packet in accordance with predetermined host system controls accessible to the host system for the first client device if the host-assigned identifier identifies the first client device;
  enabling communications from a second client device that communicates through the network address translator device;
  processing the received data packet in accordance with predetermined host system controls accessible to the host system for the second client device if the host-assigned identifier identifies the second client device;
  assigning to the second client device a second identifier to be included in payload portions of data packets that are communicated between the second client device and the host system, wherein the host-assigned identifier includes the second identifier; and
  assigning to the first client device a first identifier to be included in payload portions of data packets that are communicated between the first client device and the host system, wherein the host-assigned identifier includes the first identifier, and wherein:
    assigning the first identifier includes assigning the first identifier such that the host system may uniquely identify the first client device through use of the first identifier, and
    assigning the second identifier includes assigning the second identifier such that the host system may uniquely identify the second client device through use of the second identifier.

2. The method as in claim 1 wherein enabling communications includes enabling communications from the first client device operating in a home network through the network address translator device.

3. The method as in claim 1 wherein examining the portion of the data packet includes examining the payload portion of the received data packet for the host-assigned identifier that identifies the client device that communicated the received data packet.

4. The method as in claim 1 wherein examining the portion of the data packet includes examining the received data packet for the host-assigned identifier that differs from the nearest source address and that identifies the client device that communicated the received data packet.

5. The method as in claim 1 wherein enabling communications includes enabling communications from the first client device using a tunneling protocol.

6. The method as in claim 5 wherein enabling communications includes enabling communications from the first client device using L2TP.

7. The method as in claim 1 wherein enabling communications includes enabling communications from the first client device without using cookies.

8. The method as in claim 1 further comprising assigning to the first client device a first identifier to be included in payload portions of data packets that are communicated between the first client device and the host system, wherein the host-assigned identifier includes the first identifier.

9. The method as in claim 8 wherein assigning the first identifier includes assigning the first identifier such that the host system may uniquely identify the first client device through use of the first identifier.

10. The method as in claim 1 wherein:
  the first identifier includes a first routable IP address; and
  the second identifier includes a second routable IP address.

11. The method as in claim 1 wherein the predetermined host system controls include parental controls.

12. The method as in claim 1 wherein the predetermined host system controls include controls over personal identification information communicated to a third party.

13. The method as in claim 1 wherein the predetermined host system controls include controls over a personalized web page.

14. The method as in claim 1 wherein the predetermined host system controls are maintained by the host system.

15. The method as in claim 1 wherein the attribute portion of the received data packet further includes a source address that identifies the network address translator device and the method further comprises:
examining the attribute portion of the received data packet for the source address; and
using the source address to determine whether the received data packet is a first data packet received from the network address translator device;
wherein examining the portion of the received data packet includes examining the payload portion of the received data packet for the host-assigned identifier that identifies the client device that communicated the received data packet only when the received data packet is determined to be a data packet from the first data packet received from the network address translator device.

16. The method as in claim 1 further comprising identifying a user of the first client device based on the examined host-assigned identifier and a user identifier, wherein processing the received data packet includes processing the received data packet based on the examined host-assigned identifier and the user identifier.

17. The method as in claim 16 wherein:
the user identifier includes a user name, and
processing the received data packet includes processing the received data packet based on the examined host-assigned identifier and the user name.

18. The method as in claim 16 wherein:
the user identifier includes a user name and a password, and
processing the received data packet includes processing the received data packet based on the examined host-assigned identifier, the user name, and the password.

19. The method as in claim 1 further comprising identifying the client device from among several client devices based on the examined host-assigned identifier, wherein the received data packet is processed in accordance with the predetermined host system controls accessible to the host system for the identified client device.

20. A computer program stored on a computer readable medium for a host system to communicate with and to identify at least one client device that communicates with the host system through a network address translator device, comprising:
an enabling code segment that causes the computer to enable communications from a first client device through the network address translator device and to enable communications from a second client device that communicates through the network address translator device;
a receiving code segment that causes the computer to receive a data packet that includes a payload portion and an attribute portion, wherein the attribute portion includes a destination address that indicates a destination for the data packet and a nearest source address;
an examining code segment that causes the computer to examine a portion of the received data packet other than the nearest source address for a host-assigned identifier that identifies a client device that communicated the received data packet;
a processing code segment that causes the computer to process the received data packet in accordance with predetermined host system controls accessible to the host system for the first client device if the host-assigned identifier identifies the first client device and to process the received data packet in accordance with predetermined host system controls accessible to the host system for the second client device if the host-assigned identifier identifies the second client device; and
an assigning code segment that causes the computer to assign to the second client device a second identifier to be included in payload portions of data packets that are communicated between the second client device and the host system and to assign to the first client device a first identifier to be included in payload portions of data packets that are communicated between the first client device and the host system, wherein:
the first and second host-assigned identifiers include the first and second identifiers, respectively, and
the assigning code segment causes the computer to assign the first identifier such that the host system may uniquely identify the first client device through use of the first identifier and to assign the second identifier such that the host system may uniquely identify the second client device through use of the second identifier.

21. The computer program of claim 20 wherein the enabling code segment causes the computer to enable communications from the first client device operating in a home network through the network address translator device.

22. The computer program of claim 20 wherein the examining code segment causes the computer to examine the payload portion of the received data packet for the host-assigned identifier that identifies the client device that communicated the received data packet.

23. The computer program of claim 20 wherein the examining code segment causes the computer to examine the received data packet for the host-assigned identifier that differs from the nearest source address and that identifies the client device that communicated the received data packet.

24. The computer program of claim 20 wherein the enabling code segment causes the computer to enable communications from the first client device using a tunneling protocol.

25. The computer program of claim 24 wherein the enabling code segment causes the computer to enable communications from the first client device using L2TP.

26. The computer program of claim 20 wherein the enabling code segment causes the computer to enable communications from the first client device without using cookies.

27. The computer program of claim 20 further comprising an assigning code segment that causes the computer to assign to the first client device a first identifier to be included in payload portions of data packets that are communicated between the first client device and the host system, wherein the host-assigned identifier includes the first identifier.

28. The computer program of claim 27 wherein the assigning code segment causes the computer to assign the first identifier such that the host system may uniquely identify the first client device through use of the first identifier.

29. The computer program of claim 20 wherein:
the first identifier includes a first routable IP address; and the second identifier includes a second routable IP address.

30. The computer program of claim 20 wherein the predetermined host system controls include parental controls.

31. The computer program of claim 20 wherein the predetermined host system controls include controls over personal identification information communicated to a third party.

32. The computer program of claim 20 wherein the predetermined host system controls include controls over a personalized web page.

33. The computer program of claim 20 wherein the predetermined host system controls are maintained by the host system.

34. The computer program of claim 20 wherein:
the attribute portion of the received data packet further includes a source address that identifies the network address translator device;
the examining code segment causes the computer to examine the attribute portion of the received data packet for the source address and uses the source address to determine whether the received data packet is a first data packet received from the network address translator device; and
the examining code segment causes the computer to examine the payload portion of the received data packet for the host-assigned identifier that identifies the client device that communicated the received data packet only when the received data packet is determined to be a data packet from the first data packet received from the network address translator device.

35. The computer program of claim 20 further comprising an identifying code segment that causes the computer to identify a user of the first client device based on the examined host-assigned identifier and a user identifier, wherein the processing code segment causes the computer to process the received data packet based on the examined host-assigned identifier and the user identifier.

36. The computer program of claim 35 wherein:
the user identifier includes a user name, and
the processing code segment causes the computer to process the received data packet based on the examined host-assigned identifier and the user name.

37. The computer program of claim 35 wherein:
the user identifier includes a user name and a password, and
the processing code segment causes the computer to process the received data packet based on the examined host-assigned identifier, the user name, and the password.

38. The computer program of claim 20 further comprising an identifying code segment that causes the computer to identify the client device from among several client devices based on the examined host-assigned identifier, wherein the processing code segment causes the computer to process the received data packet in accordance with the predetermined host system controls accessible to the host system for the identified client device.

39. A method for a host system to communicate with and to identify at least one client device that communicates with the host system through a network address translator device, the method comprising:
enabling communications from a first client device through the network address translator device;
receiving a data packet that includes a payload portion and an attribute portion, wherein the attribute portion includes a destination address that indicates a destination for the data packet and a nearest source address and wherein the attribute portion of the received data packet further includes a source address that identifies the network address translator device;
examining a portion of the received data packet other than the nearest source address for a host-assigned identifier that identifies a client device that communicated the received data packet;
processing the received data packet in accordance with predetermined host system controls accessible to the host system for the first client device if the host-assigned identifier identifies the first client device;
examining the attribute portion of the received data packet for the source address; and
using the source address to determine whether the received data packet is a first data packet received from the network address translator device,
wherein examining the portion of the received data packet includes examining the payload portion of the received data packet for the host-assigned identifier that identifies the client device that communicated the received data packet only when the received data packet is determined to be a data packet from the first data packet received from the network address translator device.

40. A method for a host system to communicate with and to identify at least one client device that communicates with the host system through a network address translator device, the method comprising:
enabling communications from a first client device through the network address translator device;
receiving a data packet that includes a payload portion and an attribute portion, wherein the attribute portion includes a destination address that indicates a destination for the data packet and a nearest source address;
examining a portion of the received data packet other than the nearest source address for a host-assigned identifier that identifies a client device that communicated the received data packet;
processing the received data packet in accordance with predetermined host system controls accessible to the host system for the first client device if the host-assigned identifier identifies the first client device; and
identifying a user of the first client device based on the examined host-assigned identifier and a user identifier, wherein:
the user identifier includes a user name, and
processing the received data packet includes processing the received data packet based on the examined host-assigned identifier and the user name.

41. A method for a host system to communicate with and to identify at least one client device that communicates with the host system through a network address translator device, the method comprising:
enabling communications from a first client device through the network address translator device;
receiving a data packet that includes a payload portion and an attribute portion, wherein the attribute portion includes a destination address that indicates a destination for the data packet and a nearest source address;
examining a portion of the received data packet other than the nearest source address for a host-assigned identifier that identifies a client device that communicated the received data packet;
processing the received data packet in accordance with predetermined host system controls accessible to the host system for the first client device if the host-assigned identifier identifies the first client device; and identifying a user of the first client device based on the examined host-assigned identifier and a user identifier, wherein:

the user identifier includes a user name and a password, and processing the received data packet includes processing the received data packet based on the examined host-assigned identifier, the user name, and the password.

42. A computer program stored on a computer readable medium for a host system to communicate with and to identify at least one client device that communicates with the host system through a network address translator device, comprising:

an enabling code segment that causes the computer to enable communications from a first client device through the network address translator device;

a receiving code segment that causes the computer to receive a data packet that includes a payload portion and an attribute portion, wherein the attribute portion includes a destination address that indicates a destination for the data packet and a nearest source address;

an examining code segment that causes the computer to examine a portion of the received data packet other than the nearest source address for a host-assigned identifier that identifies a client device that communicated the received data packet; and a processing code segment that causes the computer to process the received data packet in accordance with predetermined host system controls accessible to the host system for the first client device if the host-assigned identifier identifies the first client device, wherein:

the attribute portion of the received data packet further includes a source address that identifies the network address translator device, the examining code segment causes the computer to examine the attribute portion of the received data packet for the source address and uses the source address to determine whether the received data packet is a first data packet received from the network address translator device, and the examining code segment causes the computer to examine the payload portion of the received data packet for the host-assigned identifier that identifies the client device that communicated the received data packet only when the received data packet is determined to be a data packet from the first data packet received from the network address translator device.

43. A computer program stored on a computer readable medium for a host system to communicate with and to identify at least one client device that communicates with the host system through a network address translator device, comprising:

an enabling code segment that causes the computer to enable communications from a first client device through the network address translator device;

a receiving code segment that causes the computer to receive a data packet that includes a payload portion and an attribute portion, wherein the attribute portion includes a destination address that indicates a destination for the data packet and a nearest source address;

an examining code segment that causes the computer to examine a portion of the received data packet other than the nearest source address for a host-assigned identifier that identifies a client device that communicated the received data packet;

a processing code segment that causes the computer to process the received data packet in accordance with predetermined host system controls accessible to the host system for the first client device if the host-assigned identifier identifies the first client device; and an identifying code segment that causes the computer to identify a user of the first client device based on the examined host-assigned identifier and a user identifier, wherein:

the user identifier includes a user name, and the processing code segment causes the computer to process the received data packet based on the examined host-assigned identifier and the user name.

44. A computer program stored on a computer readable medium for a host system to communicate with and to identify at least one client device that communicates with the host system through a network address translator device, comprising:

an enabling code segment that causes the computer to enable communications from a first client device through the network address translator device;

a receiving code segment that causes the computer to receive a data packet that includes a payload portion and an attribute portion, wherein the attribute portion includes a destination address that indicates a destination for the data packet and a nearest source address;

an examining code segment that causes the computer to examine a portion of the received data packet other than the nearest source address for a host-assigned identifier that identifies a client device that communicated the received data packet;

a processing code segment that causes the computer to process the received data packet in accordance with predetermined host system controls accessible to the host system for the first client device if the host-assigned identifier identifies the first client device; and an identifying code segment that causes the computer to identify a user of the first client device based on the examined host-assigned identifier and a user identifier, wherein:

the user identifier includes a user name and a password, and the processing code segment causes the computer to process the received data packet based on the examined host-assigned identifier, the user name, and the password.

* * * * *